Sept. 30, 1969    A. W. AHLGREN    3,469,875
LATCHING ASSEMBLY
Filed Nov. 6, 1967    2 Sheets-Sheet 1
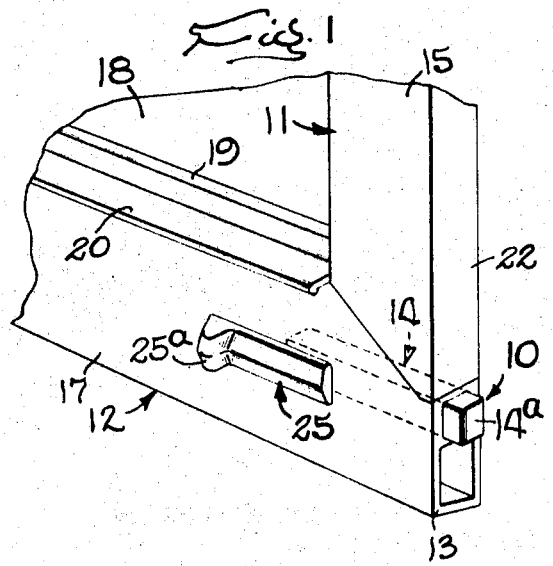
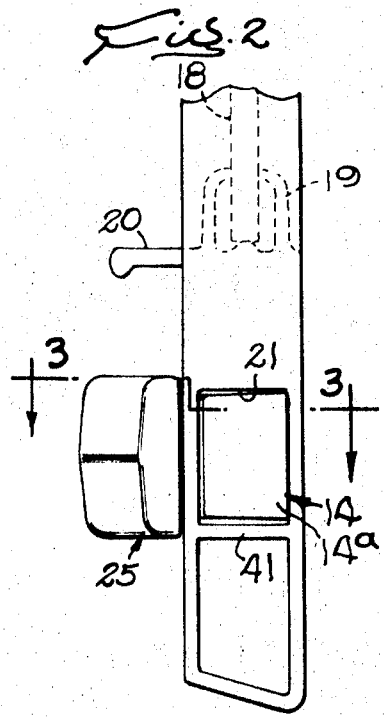
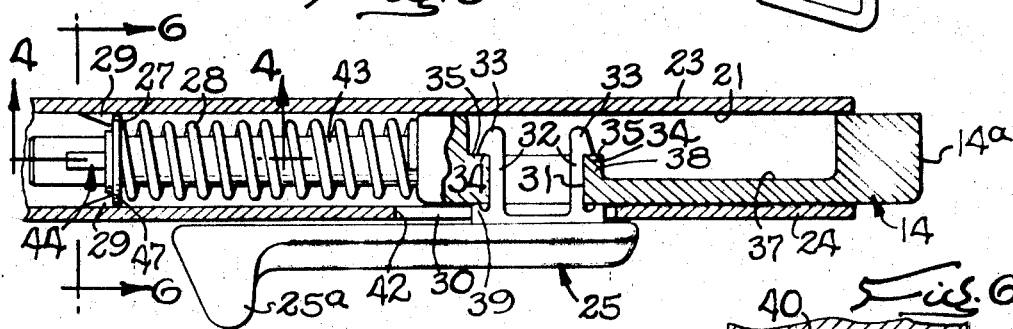
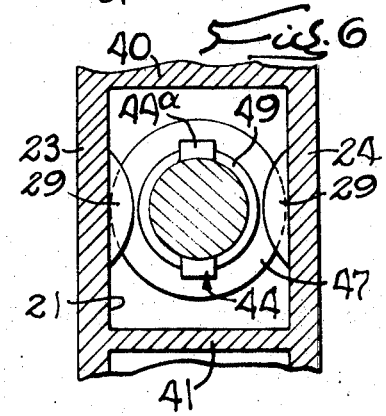
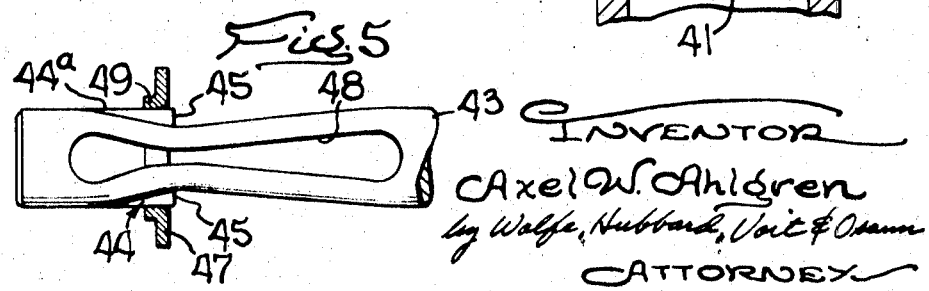
INVENTOR
Axel W. Ahlgren
by Wolfe, Hubbard, Voit & Osann
ATTORNEY

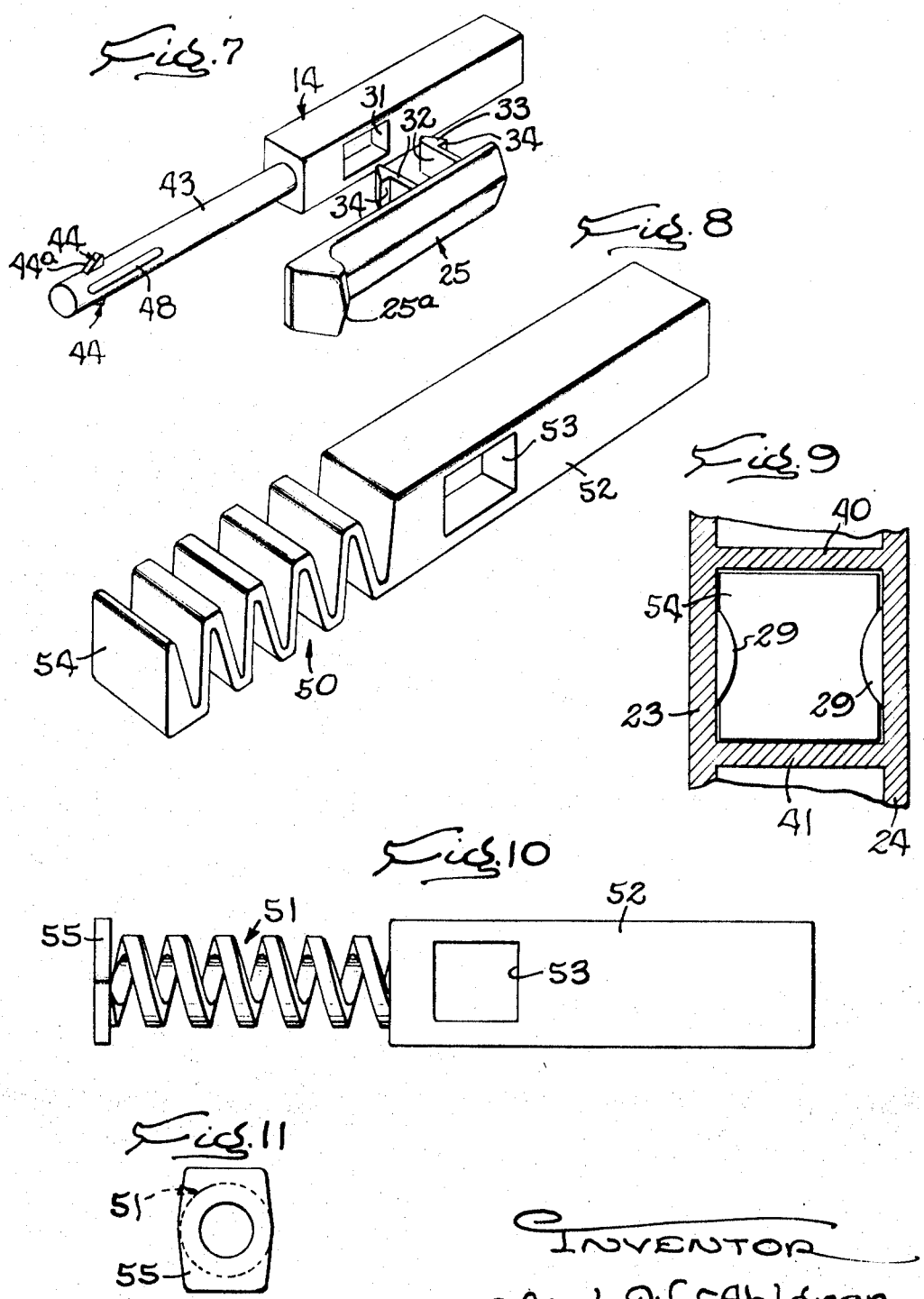

United States Patent Office 3,469,875
Patented Sept. 30, 1969

3,469,875
LATCHING ASSEMBLY
Axel W. Ahlgren, Rockford, Ill., assignor to Amerock Corporation, Rockford, Ill., a corporation of Connecticut
Filed Nov. 6, 1967, Ser. No. 680,869
Int. Cl. E05c 1/10, 1/04
U.S. Cl. 292—175                                2 Claims

ABSTRACT OF THE DISCLOSURE

A latching assembly installed in the extruded plastic frame of a storm window and comprising a bolt subassembly inserted into the frame through an edge opening, and a handle subassembly overlying a slot in the side of the frame with a stud extending through the slot and locked in a socket in the bolt. The stud comprises two spaced legs of flexible plastic with snap-locking abutments on their free ends so that the handle is installed after the bolt is in place. A spring is telescoped onto a plastic stem on the bolt and compressed thereon between the bolt and a retainer disk held in place by projections that are radially compressible as a result of a slot in the stem between the projections. This disk engages sheared stops in the bolt recess in the frame to resist retraction of the bolt. In alternative forms, the spring is formed integrally with the bolt bar as a zigzag strip and as a helical coil.

BACKGROUND OF THE INVENTION

This invention relates to latches generally and, more particularly, to a latch assembly adapted for installation on a closure such as a storm window to hold the closure in the closed position. For this purpose, such latches include a bolt slidable back and forth between extended and retracted positions at one edge of the closure, a handle fastened to the bolt to provide a readily accessible gripping element, and usually a spring holding the bolt yieldably in the extended or latching position.

SUMMARY OF THE INVENTION

The primary object of the present invention is to provide a new and improved latch assembly of relatively simple construction that is more easily and quickly installed in a closure member than prior latches of comparable type. Another object is to construct the latch in a novel manner for installation in a recessed closure frame such as an extruded plastic storm panel frame with a minimum of work on the frame and the latch and without any conventional fasteners. For this purpose, the latch is formed initially as two subassemblies that may be fitted quickly and easily into preformed recesses in the frame and joined together in final operative condition as an incident to insertion in the frame. Other objects are to connect the handle to the bolt in a novel and simple, but effective, manner; to mount a spring on the assembly in condition for operation as soon as the two subassemblies are fitted in place, and to retain the spring in this condition in a novel manner prior to installation of the assembly; and, in alternative embodiments, to combine the spring and the bolt into a single integral unit, thereby reducing the number of parts and assembly operations needed for the latch.

Other objects and advantages will become apparent from the following description, taken in conjunction with the accompanying drawings.

BRIEF DESCRIPTION OF THE DRAWINGS

FIGURE 1 is a fragmentary perspective view of a representative storm window equipped with a latch assembly embodying the novel features of the present invention.

FIG. 2 is an enlarged fragmentary side elevational view showing the edge of the window of FIG. 1 and the end of the latch assembly.

FIG. 3 is a fragmentary cross-sectional view taken substantially along the line 3—3 of FIG. 2.

FIG. 4 is an enlarged fragmentary cross-section taken substantially along the line 4—4 of FIG. 3.

FIG. 5 is a view similar to FIG. 4 but showing the parts during an assembly step.

FIG. 6 is an enlarged fragmentary cross-sectional view taken substantially along the line 6—6 of FIG. 3.

FIG. 7 is a perspective view of the bolt and the handle.

FIG. 8 is an enlarged perspective view showing a first alternative form of the bolt.

FIG. 9 is a view similar to FIG. 6 with the bolt of FIG. 8.

FIG. 10 is a side elevational view of a second alternative form of the bolt.

FIG. 11 is an end view of the bolt of FIG. 10.

DETAILED DESCRIPTION OF THE PREFERRED EMBODIMENT, FIGS. 1-7

As shown in the drawings for purposes of illustration, the invention is embodied in a latch assembly 10 mounted in the sash 11 of a storm window 12 in the usual position adjacent one lower corner 13 of the window sash and having a bolt 14 positioned for latching engagement with a keeper (not shown) mounted on the frame in which the window is set. When used with storm windows of the type that are raised and lowered in a frame, two or more keepers may be spaced vertically in the frame to latch the window in one or more raised positions as well as in a closed positions.

In the illustrative window 12, the sash 11 is formed by extruded plastic side and end pieces 15 and 17 suitably secured together in a rectangular shape, and the pane 18 is held and sealed in the sash by means of flanges 19 (FIGS. 1 and 2) defining a groove extending completely around the window opening. An inwardly extending bar 20 on the lower sash piece 17 provides a grip for raising and lowering the storm window between the different positions in which it may be latched.

The latch bolt 14 herein is mounted in the lower frame piece 17 in a recess 21 (FIGS. 3 and 6) opening through the right edge 22 of the sash 11 adjacent the lower corner 13 thereof, and comprises an elongated bar having an outer end portion 14a of generally square cross-section engageable with the keeper, the bar being guided between the walls 23, 24 (FIGS. 3 and 6) of the lower sash piece for horizontal sliding. A handle 25 attached to the bolt is movable along the inner side of the sash to slide the bolt from the extended position shown in FIGS. 1 and 3 to a retracted position spaced inwardly from the extended position far enough to disengage the bolt from the keeper. Between the inner end of the bolt and a stop 27 on the sash is a spring 28 urging the bolt toward the extended position. Herein, the stop is formed by two lugs 29 (FIGS. 3 and 6) on the walls 23 and 24 of the lower frame piece, the lugs preferably being sheared inwardly from the walls. With this arrangement, the bolt 14 normally is held in the extended position to latch the window 12 in a selected position, and may be retracted, against the action of the spring 28, by shifting the handle to the left. When the handle is released, the bolt snaps back to the right into latching engagement with an alined keeper.

In accordance with the primary aspect of the present invention, the latching assembly 10 is constructed in a novel manner for quick and easy installation in a closure without a need for any conventional fastener. To these ends, the assembly initially is formed as two relatively simple subassemblies adapted to be fitted into the recess 21 and a slot 30 in the sash 11 and connected together in operative condition as an incident to this installation, the bolt 14 and the handle 25 having means thereon for fastening the two together as the handle is positioned beside the bolt in overlying relation with the slot.

As shown most clearly in FIG. 3, the slot 30 opens through the inside wall 24 of the lower frame piece 17 into the recess 21, and the handle 25 is formed with a stud for extending through the slot and seating in a socket 31 in the bolt with a snap-locking action to couple the handle to the bolt when the latter is properly positioned in the recess. Herein, the handle is an elongated plastic molding with a gripping knob 25a adjacent one end, and the stud comprises two spaced legs 32 of preselected length formed integrally with the handle and having integral enlargements 33 on the free ends of the legs forming abutment surfaces 34 facing toward the handle for interlocking engagement with opposed surfaces 35 on the bolt. One suitable material for the handle subassembly is that sold as Delrin.

The bolt socket 31 is simply a rectangular hole formed in the bolt and opening into an elongated depression 37 in the side of the bolt opposite the handle, a thickened portion 38 of the sidewall of this depression around the hole forming the surfaces 35 for cooperating with the legs 32 in locking the handle on the bolt. A rib 39 surrounds the legs and engages the side of the bolt adjacent the handle to insure tight locking engagement with the bolt, which also may be composed of Delrin. The abutments 34 are spaced apart laterally of the stud a distance greater than the width of the socket opening, and are cammed together during insertion of the stud into the socket, then snapping into interlocking relation with the surface 35.

It will be seen in FIGS. 1, 2 and 6 that the bolt 14 is telescoped endwise into the recess 21 which is defined between the walls 23 and 24 on both sides and between two parallel webs 40 and 41 spanning the sidewalls above and below the bolt and integrally joined to the sidewalls. The stud formed by the two legs 32 is sufficiently narrower than the length of the slot 30 to accommodate the required back and forth movement of the bolt, and the end walls 42 of the slot constitute stops for limiting such sliding and thus retaining the bolt against sliding out of the sash.

In the primary form shown in FIGS. 1-7, the spring 28 is a coiled compression spring telescoped onto an elongated cylindrical stem 43 projecting inwardly from the inner end of the bolt 14 and constituting an extension of the latter, the stem herein being molded integrally with the bolt bar. For quick and easy, but permanent, installation of the spring on the bolt, the inner end of the stem has a pair of projections 44 in the form of wedges having inclined cam surfaces 44a leading to generally radial abutments 45 facing toward the bolt, and is radially compressible at the projections to permit a retainer disk 47 to be slipped onto the stem and pressed over the projections into the position shown in FIGS. 3 and 4 after the spring has been telescoped onto the stem.

To introduce the necessary compressibility of the stem 43, the central portion of the stem is made hollow, herein by forming an elongated slot 48 in the stem, so that the retainer 47 and the cams 44a can cooperate in squeezing the projections inwardly (see FIG. 5) as an incident to sliding of the retainer onto the stem. The retainer is simply a washer having an annular flange 49 around the center hole for smooth sliding contact with the cams. After the retainer clears the projections, the natural resilence of the plastic snaps the projections outwardly behind the retainer to lock it in place. It will be seen in FIGS. 3 and 6 that the outer peripheral portion of the retainer abuts against the stops 29 on the walls 23 and 24 of the lower sash piece 17. The spring preferably is slightly compressed and pre-loaded in the assembled condition, and acts through the retainer and the stops 29 to oppose retraction of the bolt 14.

The two subassemblies of the latch assembly 10 may be shipped to a storm window manufacturer in knockdown condition ready for installation in storm windows in a very simple operation. First, the bolt subassembly, including the mounted spring 28, is fitted into the sash through the opening in the edge 22 between the webs 40 and 41 and held in the recess 21 with the socket 31 alined with the slot 30, and then the stud on the handle 25 is pressed into the socket through the slot as the handle is positioned alongside the lower sash piece 17. When the abutments 34 on the two legs 32 snap into locking relation with the abutments formed by the surface 35 of the bolt, the latching assembly is ready for service use.

DESCRIPTION OF THE ALTERNATIVE EMBODIMENTS

The alternative forms shown in FIGS. 8–11 use the same handle subassembly but have a simplified bolt subassembly in which the spring 50 or 51 is molded integrally with the bolt. The outer or bar portion 52 of the bolt may be identical to that shown in FIGS. 1–7, having a rectangular socket 53 for receiving a locking stud on the handle, and the spring is a strip of resiliently flexible plastic molded integrally to one end of the bolt and shaped as a compression spring extending away from the end of the bolt, along the longitudinal axis of the latter.

In FIGS. 8 and 9, the spring 50 is a continuous strip of plastic bending zigzag fashion back and forth between the planes of the upper and lower sides of the bolt 52 and terminating in a flat rectangular end surface 54 engageable with the stops 29 of the sash, as shown in FIG. 9. The spring 51 shown in FIG. 10 is shaped as a helical coil integrally joined at one end to the bolt 52 and at the other end to a plastic wafer 55 perpendicular to the axis of the spring and the bolt. This wafer engages the stops 29 of the sash in the same way as is shown in FIG. 9, and has a center hole 57 which is a continuation of the central passage through the spring.

Both of these bolt subassemblies are installed with the same procedure used for the first form, and function in the same manner as the first form. It will be evident, however, that the eliminate the need for a retainer 47 and a separate spring 28, and thus not only reduce the number of parts but also eliminate an assembly operation.

I claim as my invention:

1. In combination with a closure member having an elongated bolt recess opening through one edge of the member and a handle slot opening into said recess through one side of the member between the ends of said recess, the improvement comprising, an elongated latch bolt fitted in said recess for back and forth sliding between an extended position in which one end portion of said bolt projects outwardly beyond said one edge and a retracted position spaced inwardly from said extended position, an elongated stem composed of resiliently flexible plastic and fast on the other end of said bolt within said recess, a coiled compression spring telescoped onto said stem, a retainer disk slidably telescoped onto said stem for compressing said spring between the bolt and said retainer, abutments on said stem holding said retainer on the stem, said abutments comprising surfaces of projections on said stem, the latter having an elongated longitudinal slot in the area of said projections whereby said retainer may be pressed over the projections as an incident to radial compression of the stem, a stop in said recess engaging said retainer to yieldably resist retraction of said bolt, a handle positioned outside said member in overlying relation with said slot, spaced legs of resiliently flexible plastic on said handle extending inwardly through said slot, locking abutments on the inner ends of said legs facing back toward said handle, said bolt having a socket opening alined with said slot for receiving said legs and said abutments being spaced apart, when free, a distance greater than the width of said opening and yielding together upon insertion through the latter, and said bolt also having a surface facing away from said handle to cooperate with said legs in connecting said handle and said bolt with a snap-locking action as an incident to insertion of said legs through said slot into said socket and movement of said abutments past said surface.

2. For use with a closure member having a bolt recess opening through one edge of the member and a handle slot opening transversely into said recess through one side of said member, a latch assembly comprising an elongated bolt sized to fit into said recess and slide back and forth longitudinally therein between an extended position in which one end of said bolt projects beyond said one edge and a retracted position spaced inwardly from said extended position, a handle adapted to be disposed in an operative position closely adjacent said one side and overlying said slot, means on said handle and said bolt for connecting the two together through said slot upon movement of said handle into said operative position, a compression spring on said bolt extending inwardly away from the other end of the bolt, a stem extending inwardly away from said other end and having abutments facing toward said other end, said spring being telescoped onto said stem, and a retainer telescoped onto said stem and disposed between said stem abutments and the adjacent end of said spring for engagement with said member to compress the spring as said bolt slides toward said retracted position, said stem abutments being projections formed around the stem and being resiliently compressible, said projections having cam surfaces for compressing the projections inwardly as said retainer is telescoped onto the stem.

References Cited

UNITED STATES PATENTS

| | | | |
|---|---|---|---|
| 434,295 | 8/1890 | Richardi | 107—50 |
| 841,364 | 1/1907 | Wickwar | 292—353 |
| 2,533,483 | 12/1950 | Losquadro | 339—198 |
| 2,714,030 | 7/1955 | Gardner | 292—178 |
| 2,891,103 | 6/1959 | Swengel | 174—153 |
| 2,980,880 | 4/1961 | Winkler, et al. | 339—50 |
| 3,298,641 | 1/1967 | Pverner | 248—27 |
| 2,813,740 | 11/1957 | Schlage | 292—169 |
| 3,089,720 | 5/1963 | Schlage | 292—169 |

MARVIN A. CHAMPION, Primary Examiner

R. L. WOLFE, Assistant Examiner